United States Patent
Zupancic et al.

(10) Patent No.: US 10,513,643 B2
(45) Date of Patent: Dec. 24, 2019

(54) BISPHENOL-A-FREE COLD DRAW LAMINATING ADHESIVE

(71) Applicants: Dow Global Technologies LLC, Midland, MI (US); Rohm and Haas Company, Philadelphia, PA (US)

(72) Inventors: Joseph J. Zupancic, Glen Ellyn, IL (US); Amira A. Marine, Missouri City, TX (US); David E. Vietti, Cary, IL (US); Daniele Vinci, Lucerne (CH)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 83 days.

(21) Appl. No.: 15/526,109

(22) PCT Filed: Nov. 10, 2015

(86) PCT No.: PCT/US2015/059965
§ 371 (c)(1),
(2) Date: May 11, 2017

(87) PCT Pub. No.: WO2016/077355
PCT Pub. Date: May 19, 2016

(65) Prior Publication Data
US 2017/0306200 A1    Oct. 26, 2017

Related U.S. Application Data

(60) Provisional application No. 62/078,748, filed on Nov. 12, 2014.

(51) Int. Cl.
| | |
|---|---|
| *C09J 167/00* | (2006.01) |
| *C09D 167/00* | (2006.01) |
| *C08L 67/00* | (2006.01) |
| *C08K 5/52* | (2006.01) |
| *C08L 63/00* | (2006.01) |
| *C08K 5/29* | (2006.01) |
| *C08L 67/02* | (2006.01) |
| *C08L 75/06* | (2006.01) |

(52) U.S. Cl.
CPC .............. *C09J 167/00* (2013.01); *C08K 5/29* (2013.01); *C08K 5/52* (2013.01); *C08L 63/00* (2013.01); *C08L 67/00* (2013.01); *C08L 67/025* (2013.01); *C08L 75/06* (2013.01); *C09D 167/00* (2013.01)

(58) Field of Classification Search
CPC .... C09J 167/025; C09J 163/00; C09J 167/00; C08L 67/025; C08G 59/04; C08G 59/12; C08G 59/40; C08G 59/50; C08G 59/5013; C08G 59/5073
See application file for complete search history.

(56) References Cited

U.S. PATENT DOCUMENTS

| | | | | |
|---|---|---|---|---|
| 3,395,128 A | * | 7/1968 | Hale | C08G 59/24 528/102 |
| 3,616,192 A | * | 10/1971 | Sinclair | B32B 27/00 428/13 |
| 4,242,253 A | * | 12/1980 | Yallourakis | C09D 167/00 523/415 |
| 4,335,222 A | | 6/1982 | Klemme | |
| 4,734,303 A | | 3/1988 | Fujiwara et al. | |
| 5,144,824 A | | 9/1992 | Kobayashi et al. | |
| 5,202,391 A | | 4/1993 | Yamazaki et al. | |
| 5,360,649 A | | 11/1994 | Sato et al. | |
| 6,022,913 A | | 2/2000 | Tanaka et al. | |
| 6,238,783 B1 | | 5/2001 | Komai et al. | |
| 6,489,405 B1 | * | 12/2002 | Beisele | C08G 59/12 428/413 |
| 9,701,786 B2 | * | 7/2017 | Zupancic | C08G 63/916 |
| 9,701,787 B2 | * | 7/2017 | Zupancic | C08G 59/24 |
| 9,751,977 B2 | * | 9/2017 | Zupancic | C08G 63/916 |
| 9,752,066 B2 | * | 9/2017 | Zupancic | C08G 59/12 |
| 2007/0281179 A1 | | 12/2007 | Ambrose et al. | |
| 2008/0081883 A1 | | 4/2008 | King et al. | |
| 2013/0178584 A1 | | 7/2013 | Jin et al. | |
| 2017/0369634 A1 | * | 12/2017 | Zupancic | C09J 167/00 |

FOREIGN PATENT DOCUMENTS

| | | | | |
|---|---|---|---|---|
| JP | 2000328033 A | | 11/2000 | |
| WO | WO-2012149340 A1 | * | 11/2012 | ........... C07D 303/28 |
| WO | WO-2013079563 A1 | * | 6/2013 | ........... C09D 167/06 |

OTHER PUBLICATIONS

Werner Funke, et al., "Paints and Coatings, 2. Types" Ullmann's Encyclopedia of Industrial Chemistry, vol. 25, 661-730, published online 2010. (Year: 2010).*
PCT/US2015/059965 International Search Report and Written Opinion of the International Searching Authority, dated Jan. 14, 2016.
PCT/US2015/059965, International Preliminary Report on Patentability, dated May 26, 2017.

\* cited by examiner

*Primary Examiner* — Nicholas E Hill

(57) ABSTRACT

The instant invention provides a curable formulation suitable for laminating adhesive applications, and laminating adhesives made therefrom. The curable formulation suitable for laminating adhesive applications according to the present invention comprises a high molecular weight polyester resin, an epoxy-terminated polyester, an additive, a curing agent, and a solvent, wherein, upon curing under curing conditions, the curable formulation forms at least one interpenetrating polymer network.

9 Claims, No Drawings

BISPHENOL-A-FREE COLD DRAW LAMINATING ADHESIVE

REFERENCE TO RELATED APPLICATIONS

The present application claims the benefit of U.S. Provisional Application No. 62/078,748, filed Nov. 12, 2014, which is incorporated herein by reference in its entirety.

FIELD OF INVENTION

The instant invention relates to a curable formulation suitable for laminating adhesive applications, and laminating adhesives made therefrom.

BACKGROUND OF THE INVENTION

Deep draw and cold drawability laminating adhesives are used in cans or containers with metal lidding or flexible heat seal lidding. Additional uses for these laminating adhesives include food pouches, ready to eat meals, and can coatings. These laminating adhesives need to be capable of maintaining performance characteristics rendering them capable of retort processing (121° C. for 1 hour or 2 hours, 132° C. for 30 or 45 minutes) or hot-fill (66° C. for 1 hour or 2 hours) or boil-in-bag applications (100° C. for 30 minutes or 2 hours) with minimal decrease of bond strength performance. In order to achieve high performance and cold drawability in flexible laminates, one approach is the utilization of epoxidized bisphenol-A resins in a polyester system. Currently, industries are phasing out the use of bisphenol-A-based materials for food packaging. Therefore, an adhesive capable of deep draw or cold drawability which is free of bisphenol-A, is desirable.

SUMMARY OF THE INVENTION

The instant invention provides a curable formulation suitable for laminating adhesive applications, and laminating adhesives made therefrom.
In one embodiment, the instant invention provides a curable formulation suitable for laminating adhesive applications comprising, consisting of, or consisting essentially of a) a high molecular weight polyester resin; b) an epoxy terminated polyester having the structure

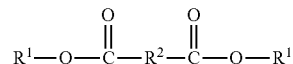

wherein —$R^2$— is a divalent organic group,
wherein $R^1$— is selected from the group consisting of

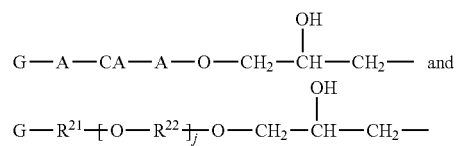

wherein -A- is a divalent alkyl group, —CA- is a divalent cycloalkyl group, j is 0 to 5, —$R^2$— is a divalent organic group, —$R^{21}$— is a divalent alkyl group, and —$R^{22}$— is a divalent alkyl group G- is

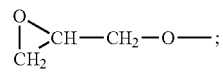

c) an additive selected from the group consisting of phosphoric acid and orthophosphoric acid;
d) a curing agent comprising of an isocyanate-based aliphatic compound or an isocyanate-based aromatic compound; and e) a solvent wherein, upon curing under curing conditions, the curable formulation forms at least one interpenetrating polymer network.

In another alternative embodiment, the instant invention further provides a laminating adhesive comprising the inventive curable formulation.

In an alternative embodiment, the instant invention provides a laminating adhesive in accordance with any of the preceding embodiments, except that the laminating adhesive is characterized by having: application solids from 20 to 35% solids, coating weight of 1.5 to 5.0 g/m$^2$, ambient (25° C.) to supra-ambient (50° C.) cure in 3 to 14 days depending upon coreactant employed, bond strength of 5.0 to 12.0 N/15 mm or greater after full cure, bond strengths of 2.0 to 8.0 N/15 mm or greater after retort processing, single glass transition temperature (Tg) of −5° C. to 30° C., and no phase separation.

DETAILED DESCRIPTION OF THE INVENTION

The instant invention provides a curable formulation suitable for laminating adhesive applications, and laminating adhesives made therefrom. The curable formulation suitable for laminating adhesives comprises a) a high molecular weight polyester resin; b) an epoxy terminated polyester having the structure

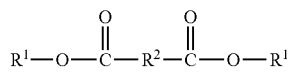

wherein —$R^2$— is a divalent organic group,
wherein $R^1$— is selected from the group consisting of

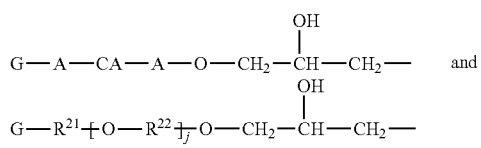

wherein -A- is a divalent alkyl group, —CA- is a divalent cycloalkyl group, j is 0 to 5, —$R^2$— is a divalent organic group, —$R^{21}$— is a divalent alkyl group, and —$R^{22}$— is a divalent alkyl group G- is

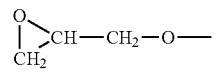

c) an additive selected from the group consisting of phosphoric acid and orthophosphoric acid; d) a curing agent comprising an isocyanate-based aliphatic compound or an isocyanate-based aromatic compound; and e) a solvent, wherein, upon curing under curing conditions, the curable formulation forms at least one interpenetrating polymer network. The curable formulation does not contain bisphenol-A or any bisphenol-A-based material.

The curable formulation comprises a high molecular weight polyester resin. The term "high molecular weight polyester resin" refers to a polyester having an average molecular weight (Mw) of 50,000 to 125,000. All individual ranges and subranges between 50,000 and 125,000 are included herein and disclosed herein; for example, the high molecular weight polyester resin can have an average molecular weight (Mw) in the range of from 70,000 to 100,000.

The high molecular weight polyester resin has a glass transition temperature (Tg) in the range of −25° C. to 40° C. All individual ranges and subranges between −25° C. and 40° C. are included herein and disclosed herein; for example, the high molecular weight polyester resin can have a Tg in the range of −15° C. to 5° C., or the high molecular weight polyester resin can have a Tg in the range of −15° C. to 0° C.

Examples of suitable high molecular weight polyester resins include, but are not limited to polyesters based upon a combination of ethylene glycol (and optionally in combination with 1,4-butanediol, 1,6-hexanediol, or neopentyl glycol), terephthalic acid, isophthalic acid, with either azelaic acid or sebacic acid or adipic acid (or combination of these aliphatic diacids). The polyester resin has an average molecular weight (Mw) in the range of from 50,000 to 125,000, preferably 65,000 to 100,000; an acid Value of ≤2.0, a hydroxyl Number (OHN) of ca. 0.5 to 5.0; and a glass transition temperature (Tg) of −25° C. to 40° C., preferred Tg of −15° C. to 5° C., more preferred Tg of −15° C. to 0° C.

The high molecular weight polyester resin is present in the curable formulation in the range of from 65 to 98 percent by weight. All individual values and subranges between 65 and 98 percent by weight are included herein and disclosed herein; for example, the polyester resin can be present in the curable formulation in the range of from 70 to 95 percent by weight, from 76 to 92 percent by weight, or from 80 to 91 percent by weight.

In various embodiments, the epoxy terminated polyester is a composition depicted by Formula I, below.

Formula I

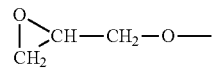

In Formula I, the two —$R^1$— groups may be identical or different. Each $R^1$ group has either the structure depicted in Formula II or the structure depicted in Formula III.

Formula II

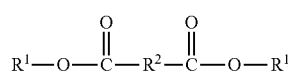

Formula III

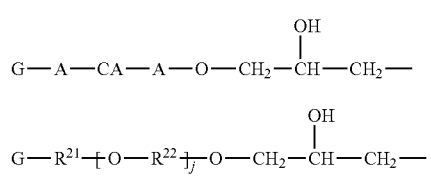

The group —$R^2$— is a divalent organic group having fewer than 50 carbon atoms. The group G- is a diglycidyl ether moiety, as depicted by the structure

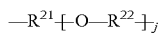

The group —CA- is a divalent cycloalkyl group. The group -A- is a divalent alkyl group.

The number j is 0 to 5. All individual values and subranges between 0 and 5 are included herein and disclosed herein; for example, j can be 0, 1, 2, 3, 4, or 5. The groups —$R^{21}$— and —$R^{22}$— can be identical or different, and are divalent alkyl groups. Examples include, but are not limited to methyl groups, methylene groups, ethyl groups, ethylene groups, larger alkyl groups and larger alkylene groups.

In various embodiments, the epoxy terminated polyester may also contain, in addition to one or more compounds having a structure as depicted in Formula I, one or more compounds having a structure as depicted in Formula IA, below.

Formula IA

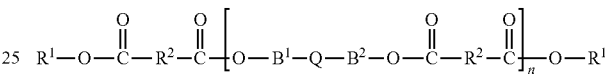

where —$B^1$— has the structure

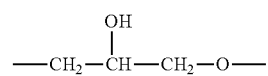

—$B^2$— has the structure

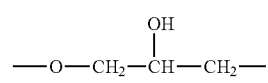

-Q- is either a cycloalkyl group or has the structure

—$R^{21}$—$[$—O—$R^{22}$—$]_j$— j is 0 to 5; all individual values and subranges between 0 and 5 are included herein and disclosed herein; for example, j can be 0, 1, 2, 3, 4, or 5. n is 1 to 6. All individual values and subranges between 1 and 6 are included herein and disclosed herein; for example n can be 1, 2, 3, 4, 5, or 6. The group —$R^{21}$— is an alkyl group. The group —$R^{22}$— is an alkyl group.

In an embodiment, —$R^2$— is a group having the structure depicted in Formula IV.

Formula IV

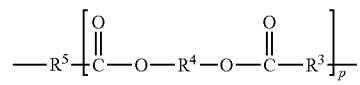

The number p is 0 to 20. All individual values and subranges between 0 and 20 are included herein and disclosed herein; for example, p can be 1, 2, 3, 4, 5, 6, 7, 8, 9, 10, 11, 12, 13, 14, 15, 16, 17, 18, 19, or 20. Each —$R^3$—, each —$R^4$—, and each —$R^5$— is, independent of the other, a divalent organic group. Within a single —$R^2$— group, if p is 2 or greater, the various —$R^3$— groups may be identical to each other or different from each other. Within a single —R²— group, if p is 2 or greater, the various —R⁴— groups may be identical to each other or different from each other.

Generally, —R³— is selected from one or more divalent aliphatic groups, one or more divalent aromatic hydrocarbon groups, or a mixture thereof. Examples of aliphatic groups include but are not limited to linear or branched alkyl groups. Generally the aliphatic groups have 1 to 12 carbon atoms. All individual values and subranges between 1 and 12 are included herein and disclosed herein; for example the aliphatic groups can have 2 carbon atoms, 3 carbon atoms, 6 carbon atoms, or 8 carbon atoms. A specific example of an aliphatic group is —CH₂CH₂CH₂CH₂—.

Examples of aromatic groups, include but are not limited to those with the structure

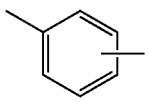

including mixtures of isomers; or those with the structure

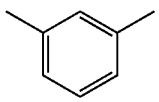

The groups that are suitable for —R⁵— are the same as those for —R³—. The group —R⁵— may be different from all of the —R³— groups, or —R⁵— may be the same as one or all of the —R³— groups.

In various embodiments, —R⁴— is either an aliphatic group or is an aliphatic ether group depicted by Formula V

   Formula V where —R⁸— and —R⁹— (if present) and —R¹⁰— are aliphatic groups, and where r is 0 to 10. The groups —R⁸— and —R⁹— (if present) and —R¹⁰— may be identical or may be different from each other. When —R⁴— is an aliphatic ether group, the following preferences apply to —R⁸—, —R⁹— (if present), —R¹⁰—, and r. In various embodiments, —R⁸— and —R⁹— (if present) and —R¹⁰— are identical. In various embodiments —R⁸— and —R⁹— (if present) and —R¹⁰— are linear or branched alkyl groups. In various embodiments —R⁸— and —R⁹— (if present) and —R¹⁰— each have 4 or fewer carbon atoms. All individual values and subranges less than or equal to 4 are included herein and disclosed herein; for example the aliphatic groups can have 1, carbon atom, 2 carbon atoms, 3 carbon atoms, or 4 carbon atoms, r is 0 to 10. All individual values and subranges between 0 and 10 are included herein and disclosed herein; for example, r is 0 to 5, 0 to 2, or zero. When —R⁴— is an aliphatic group, —R⁴— is preferably an alkyl group; more preferably a linear alkyl group. When —R⁴— is an aliphatic group, —R⁴— has 1 or more carbon atom. When —R⁴— is an aliphatic group, —R⁴— preferably has 6 or fewer carbon atoms; more preferably 4 or fewer carbon atoms; more preferably 3 or fewer carbon atoms; more preferably exactly 2 carbon atoms.

Further information about the epoxide terminated polyester and its preparation can be found in PCT Publication No. WO120151073965 and PCT Publication No. WO120151073956.

The epoxide terminated polyester will generally have an Epoxide Equivalent Weight (EEW) in the range of 600 to 3000. All individual values and subranges between 600 and 3000 are included herein and disclosed herein; for example, the epoxide terminated polyester can have an EEW in the range of 700 to 2000.

The number-average molecular weight (Mn) of the epoxy terminated polyester will generally be 500 or higher. All individual values and subranges greater than or equal to 500 are included herein and disclosed herein; for example, the epoxide terminated polyester can have a number-average molecular weight of 1000 or higher. The number-average molecular weight of the epoxide terminated polyester will generally be 8000 or lower. All individual values and subranges less than or equal to 8000 are included herein and disclosed herein; for example, the epoxide terminated polyester can have a number-average molecular weight of 6000 or lower or 5000 or lower.

The epoxide terminated polyester is generally present in the formulation in an amount in the range of from 2.0 to 35.0 weight percent. All individual values and subranges between 2.0 and 35.0 are included herein and disclosed herein; for example, the epoxide terminated polyester can be present in an amount in the range of from 3.0 to 25.0 weight percent or from 4.0 to 20.0 weight percent.

In various embodiments, phosphoric acid or orthophosphoric acid as either 75% or 85% solids in water may be used as additives for incorporation into the polyester/epoxy terminated component to improve adhesion and performance characteristics of the overall adhesive. Pyrophosphoric acid, triphosphoric or metaphosphoric acid may be used as alternatives to phosphoric acid but may have limited solubility in the polyester/epoxy terminated polyester blend or solution.

The additive is generally present in the formulation in an amount in the range of from 0.01 to 0.10 weight percent. All individual values and subranges between 0.01 and 0.10 are included herein and disclosed herein; for example, the additive acid can be present in an amount in the range of from 0.03 to 0.08 weight percent.

In various embodiments, the above components are dissolved in a solvent. Examples of solvents that can be used include, but are not limited to ethyl acetate, methyl ethyl ketone, methyl acetate, and combinations thereof.

The formulation generally comprises from 30 to 45 weight percent solids. All individual values and subranges between 30 and 45 are included herein and disclosed herein; for example, the formulation can comprise from 35 to 40 weight percent solids.

The curable formulation may further comprise additional components such as catalysts. Catalysts which can be used include, but are not limited to: Tetra alkyl titanate, Tyzor TPT Tetraisopropyl titanate, Tyzor TnBT Tetra-n-butyl titanate, Tyzor TOT tetrakis(2-ethylhexyl)titanate, Hydroxybutyltin oxide, Tin(II) 2-Ethyl-hexanoate, and Butyltin tris(2-ethyl-hexanoate). The catalyst can be utilized at levels of 5 ppm to 2000 ppm (based upon resin solids) depending upon activity. In various embodiments, the tetra alkyl titanates can be utilized at levels of 5 to 50 ppm, and at levels of 10 to 25 ppm in various other embodiments. The tin catalysts can be utilized at levels of 50 to 2000 ppm in various embodiments, and at levels of 75 to 1000 ppm in various other embodiments, and at levels of 100 to 500 ppm in various other embodiments.

Any conventional polymerization processes may be employed to produce the high molecular weight polyesters. Such conventional polymerization processes include, but are not limited to, solid polymerization process, using one or more conventional reactors e.g. autoclave reactors, isothermal reactors, stirred tank reactors, batch reactors in parallel, series, and/or any combinations thereof.

The polyesters can for example, be produced via solid phase polymerization process using one or more loop reactors, isothermal reactors, and combinations thereof.

In various embodiments, the epoxide terminated polyesters can be made by reacting at least one diepoxide with at least one dicarboxylic acid. In the reaction of at least one diepoxide with at least one dicarboxylic acid, the ratio of moles of epoxy to moles of carboxylic acid polyester will generally be 2:1 to 2:1.4. All individual ranges and subranges between 2:1 and 2:1.4 are included herein and disclosed herein; for example, the ratio of moles of epoxy to moles of carboxylic acid polyester can be 2:1.1 to 2:1.35 or 2:1.15 to 2:1.30.

The reaction of diepoxide with dicarboxylic acid is optionally conducted in the presence of a catalyst. Examples of catalysts include, but are not limited to triaryl phosphorous compounds with a soluble chromium compound, tetra-substituted phosphonium salts, quaternary ammonium salts, carbonate salt, hydroxide salts, and salts of carboxylic acids. More preferred are tetra-substituted phosphonium salts, carbonate salts, and salts of carboxylic acids.

The formulation can then be prepared by any suitable method, such as admixing the individual components in any combination or subcombination.

The curable formulation is cured with an isocyanate curing agent. Examples of isocyanate curing agents/prepolymers include, but are not limited to isocyanates such as Isophorone Diisocyanate (IPDI) based prepolymers, meta-Xylene Diisocyanate (m-XDI), Hexamethylene Diisocyanate (HDI), Toluene Diisocyanate (TDI), and Diphenylmethane Diisocyanate (MDI). Examples of isocyanate terminated prepolymers which can be utilized include, but are not limited to these prepolymers (resins), such as IPDI-Trimethylolpropane adduct (IPDI-TMP Adduct), IPDI-trimer (Isophorone Diisocyanate Isocyanurate (Vestanat T1890/100)), XDI-Trimethylolpropane Adduct (XDI-TMP Adduct) (Takenate D-110N, Takenate D-110NB, Desmodur XP-2843), HDI-trimer (HDI-Biuret (Desmodur N 75 BA) or HDI-Isocyanurate (Desmodur N 3390 BA or 75HDI Homopolymer)), TDI-Trimethylolpropane-Diethylene Glycol prepolymer (Desmodur L-75), MDI-Trimethylolpropane prepolymer (Coreactant CT), etc. For retort applications in food packaging, aliphatic isocyanates are generally used.

The curable formulation is cured with the isocyanate curing agent in a mix ratio in the range of from 100:1.0 to 100:8.0. All individual values and subranges between 100:1.0 and 100:8.0 are included herein and disclosed herein.

Upon curing, at least one interpenetrating polymer network system (IPN) is formed. An IPN is a combination of two or more polymers that form networks wherein at least one polymer is polymerized and/or crosslinked as a network in the presence of the other polymers. In an embodiment, an interpenetrating polymer network is formed between the either the pendant epoxide or hydroxyl groups of the epoxy terminated polyester and isocyanate groups of the isocyanate curing agent. The primary reaction of the isocyanate curing agent with the epoxy terminated polyester is expected to occur by the reaction of the pendant hydroxyl groups of the epoxy terminated polyester. The secondary reaction is the reaction of the isocyanate group with residual water in the resin or on the surface of the film or foil to form an amine functional group which then will react further with the epoxide functionality. The direct reaction of the epoxide group with an isocyanate moiety typically occurs at elevated temperatures (150° C.-200° C.), thus this reaction to yield the oxazolidone moiety is not expected to be the predominant reaction pathway for the present invention.

The curable formulation according to the present invention can be formed into laminating adhesives and can be used in various packaging applications, e.g. food packaging applications. The laminates prepared according to the present invention may be used in various packaging applications, e.g. food packaging applications such as cans or containers with metal lidding or flexible heat seal lidding, pouches, or packaging trays. The laminating adhesives according to the present invention have a single glass transition temperature (Tg) in the range of from −5° C. to 30° C., for example from −5° C. to 10° C., e.g. approximately 0° C. The laminating adhesives according to the present invention also have a bond strength upon curing in the range of 5.0 to 12.0 N/15 mm, e.g. 7.0 N/15 mm. The laminating adhesives according to the present invention also have a bond strength after retort processing in the range of 2.0 to 8.0 N/15 mm, e.g. 6.0 N/15 mm.

EXAMPLES

Commercial polyester resins employed as comparative examples are: Adcote 1189B, Adcote 102A, Adcote 102E and Adcote 506-40. The properties of each of these resins are summarized in Table 1.

TABLE 1

Commercial Resin Properties

| Properties | Adcote 1189B | Adcote 102A | Adcote 102E | Adcote 506-40 |
|---|---|---|---|---|
| % Solids | 45.0 | 40.0 | 36.0 | 40.0 |
| Viscosity (mPa * s) | 2400 | 700 | 1500 | 450 |
| Solvent System | Methyl Ethyl Ketone | Methyl Ethyl Ketone | Ethyl Acetate | Methyl Ethyl Ketone |
| SEC Analysis | | | | |
| Mn | 30000 | — | 40272 | — |
| Mw | 68169 | — | 73884 | — |
| Polydispersity | 2.208 | — | 1.835 | — |

Viscosity for 100% solid resins is measured by employing a Brookfield RV DV-II+ Viscometer with a thermostated small sample adapter with a spindle #27 and varying the temperature over a range of 25 to 70° C. in increments of 5° C. and allowing the sample to stabilize at temperature for 20 to 30 mins prior to recording viscosity. Viscosity is reported in milliPascal*seconds (mP*s), which is equal to centipoise.

Solution viscosity is measured with a Brookfield viscometer according to method ASTM D2196-10 (ASTM, West Conshohocken, Pa., USA).

Acid Value (AV) is measured by the method of ASTM D3655-06 (American Society for Testing and Materials, West Conshohocken, Pa., USA).

Epoxy Equivalent Weight (EEW) is measured by the method of ASTM D1652-11 (American Society for Testing and Materials, West Conshohocken, Pa., USA).

Density is measured by the method of ASTM D1475-98 (2012) (American Society for Testing and Materials, West Conshohocken, Pa., USA).

Size Exclusion Chromatography (SEC) used two PLgel Mix-B and PLgel Mixed-D columns and Viscotek's triple detector. Polystyrene standards were used to establish a universal calibration curve that determines the weight-averaged and number-averaged molecular weights. The sample was diluted with THF to a polymer concentration of approximately 2.5 mg/ml prior to analysis.

Example 1

Polyester Preparation

| Item | Ingredient | Charge (g) |
|---|---|---|
| 1 | Isophthalic Acid | 908.62 |
| 2 | Diethylene Glycol | 1126.80 |
| 3 | Fascat 9100 (Hydroxybutyltin oxide) | 0.5730 |
| 4 | Adipic Acid | 1198.87 |

Items 1-3 were charged to a vessel at Ambient Temperature (25-30° C.). The resin was heated to 100° C. under Nitrogen with stirring. Resin was then heated to 225° C. and was held at 225° C., when ca. 50% of theoretical water was off. AV and In-Process Viscosity were monitored. The resin was maintained at 225° C. until AV<ca. 75. The resin was then cooled to <125° C. Item 4 was then added and the resin was maintained at 125-135° C. for 0.50 Hrs. The temperature was increased to 225° C. and was maintained at 225° C.; vacuum was applied at 327 mm as needed as to decrease AV to final target property. AV and Viscosity were monitored; the temperature was maintained at 225° C. until AV<ca. 150. The resin was then cooled to about 150° C., filtered and packaged.

The final resin had the following properties: Acid Value (AV) 149.73, Mn 950, Mw 1750, Mz 2550, Wt. Fraction≤500 Daltons 10.6%, Wt. Fraction≤1000 Daltons 32.1%, Viscosity at 25° C. of 29500 mPa*s.

Example 2

Polyester Preparation

| Item | Ingredient | Charge (g) |
|---|---|---|
| 1 | Isophthalic Acid | 942.70 |
| 2 | Diethylene Glycol | 654.60 |
| 3 | Ethylene Glycol | 362.20 |
| 4 | Fascat 9100 (Hydroxybutyltin oxide) | 0.3168 |
| 5 | Adipic Acid | 1239.19 |

Items 1-4 were charged to vessel at Ambient Temperature (25-30° C.). The resin was heated to 100° C. under Nitrogen with stirring. The resin was then heated to 225° C. and held at 225° C., when ca. 50% of theoretical water was off. AV and In-Process Viscosity were monitored. The resin was maintained at 225° C. until AV<ca. 80. The resin was then cooled to <125° C. Item 5 was then added and the resin was maintained at 125-135° C. for 0.50 Hrs. The temperature was increased to 225° C. and was maintained at 225° C. Vacuum was applied at 327 mm as needed as to decrease AV to final target property. AV and Viscosity were monitored; the temperature was maintained at 225° C. until AV<ca. 105. The resin was then cooled to about 150° C., filtered and packaged.

The final resin had the following properties: Acid Value (AV) 98, Mn 1200, Mw 2450, Mz 3900, Wt. Fraction≤500 Daltons 7.6%, Wt. Fraction≤1000 Daltons 22.2%, Viscosity at 25° C. of 271,500 mPa*s.

Example 3

Polyester Preparation

| Item | Ingredient | Charge (g) |
|---|---|---|
| 1 | Isophthalic Acid | 1158.60 |
| 2 | Diethylene Glycol | 720.90 |
| 3 | Ethylene Glycol | 398.30 |
| 4 | Fascat 9100 (Hydroxybutyltin oxide) | 0.4089 |
| 5 | Adipic Acid | 1525.85 |

Items 1-4 were charged to vessel at Ambient Temperature (25-30° C.). The resin was heated to 100° C. under Nitrogen with stirring. The resin was then heated to 225° C. and held at 225° C., when ca. 50% of theoretical water was off. The AV and In-Process Viscosity were monitored. The resin was maintained at 225° C. until AV<ca. 80. The resin was then cooled to <125° C. Item 5 was then added and the resin was maintained at 125-135° C. for 0.50 Hrs. The temperature was then increased to 225° C. and maintained at 225° C. Vacuum was applied at 435 mm as needed as to decrease AV to final target property. AV and Viscosity were monitored. The resin was maintained at 225° C. until AV<ca. 160. The resin was then cooled to about 150° C., filtered and packaged.

The final resin had the following properties: Acid Value (AV) 153, Mn 650, Mw 1550, Mz 2650, Wt. Fraction≤500 Daltons 19.2%, Wt. Fraction≤1000 Daltons 42.8%, Viscosity at 25° C. of 173,750 mPa*s.

Examples 4-8

Preparations of Epoxide Terminated Polyester Resins

The preparations in Examples 3-5 were similar. Diepoxide, one or more diacid, and catalyst were charged to the reactor. Slowly Heated to 135-140° C. Maintained at 135-140° C. for ca. 0.50 Hrs and then heated to 150-155° C. and maintained at 150-155° C. for ca. 1.5 to 2 Hrs and then monitored AV and Viscosity. Maintained at 150-155° C. and monitored AV and Visc until AV<1.0; transferred resin and package.

The formulations of Examples 4-8 are shown in Table 2, below.

TABLE 2

Examples 4-8

| | Example Number: | | | | |
|---|---|---|---|---|---|
| Ingredient (g) | 4 | 5 | 6 | 7 | 8 |
| DER 736 | 775.25 | 763.54 | 600.32 | 738.40 | 533.48 |
| Polyester Resin of Ex. 1 | 917.33 | | | | |
| Polyester Resin of Ex. 2 | | 923.08 | 1010.75 | | |

TABLE 2-continued

Examples 4-8

| | Example Number: | | | | |
|---|---|---|---|---|---|
| | 4 | 5 | 6 | 7 | 8 |
| Polyester Resin of Ex. 3 | | | | 918.60 | 610.18 |
| Isophthalic Acid | | | | | 11.96 |
| Sodium Acetate | 0.5677 | 0.5467 | 0.5156 | 0.5217 | |
| Sodium Carbonate | | | | | 0.3722 |
| Properties | | | | | |
| EEW | 847.66 | 759.98 | 1244.17 | 1417.64 | 1721.41 |
| Acid Value | 0.04 | <0.1 | <0.1 | <0.1 | <0.1 |
| Mn | 2150 | 1700 | 3200 | 3050 | 5050 |
| Mw | 13250 | 10000 | 23450 | 48200 | 37250 |
| Mz | 39550 | 31500 | 82350 | 248300 | 141850 |
| Wt. Fraction ≤500 (%) | 6.5 | 9.6 | 3.4 | 3.6 | <0.1 |
| Wt. Fraction ≤1000 (%) | 12.2 | 15.6 | 8.0 | 8.3 | 3.2 |
| Viscosity at 25° C. (mPa * s) | 58125 | 38550 | 272,500 | 776,667 | 533,333 |
| Viscosity at 70° C. (mPa * s) | 1862 | 1328 | 6150 | 15000 | 10150 |

The formulations of Examples 9-11 are shown in Table 3, below.

TABLE 3

Examples 9-11

| | Example Number: | | |
|---|---|---|---|
| | 9 | 10 | 11 |
| Ingredient (g) | | | |
| ERISYS GE-21 | 510.58 | | |
| DER 731 | | 347.64 | 696.70 |
| Polyester Resin of Ex. 3 | 702.17 | 456.94 | 931.64 |
| Isophthalic Acid | | | |
| Sodium Acetate | 0.4556 | 0.3114 | 0.6033 |
| Sodium Carbonate | | | |
| Ethyl Acetate | | | 837.92 |
| Properties | | | |
| % Solids | 100 | 100 | 64.28 |
| EEW | 931.03 | 908.26 | 1353.6 |
| Acid Value | <0.1 | <0.1 | <0.1 |
| Mn | 2500 | 4700 | 1850 |
| Mw | 40600 | 78300 | 30000 |
| Mz | 237200 | 481400 | 186550 |
| Wt. Fraction ≤500 (%) | 4.1 | <0.1 | 6.4 |
| Wt. Fraction ≤1000 (%) | 10.6 | 5.2 | 14.1 |
| Viscosity at 25° C. (mPa * s) | 226500 | 208750 | 288.67 |
| Viscosity at 70° C. (mPa * s) | 6875 | 6875 | |
| Density (g/cc) | | | 1.1066 |

Example 12

Preparation of Modified Isocyanate Coreactant

| Item | Monomer/Intermediate | Charge (g) |
|---|---|---|
| 1 | 75% Vestanat T1890/100 in Ethyl Acetate | 1561.80 |
| 2 | 3-Aminopropyltriethoxysilane | 18.49 |
| 3 | Ethyl Acetate | 45.65 |
| 4 | Ethyl Acetate | 30.91 |
| 5 | Ethyl Acetate | 41.99 |

Item 1 was charged to a 3-Liter one-piece reactor and heated to 35-40° C. A solution of Items 2 and 3 were slowly added over a 0.50 Hr period, then the charge tank was flushed with Item 4. The resin was maintained at 35-40° C. for 1 Hr, filtered and packaged, and the solids were adjusted with Item 5 as needed.

Final properties: ASTM solids 72.78%, 11.50% NCO, Viscosity 576 cps.

Example 13

Preparation of Modified Isocyanate Coreactant

| Item | Monomer/Intermediate | Charge (g) |
|---|---|---|
| 1 | 75% Vestanat T1890/100 in Ethyl Acetate | 1531.20 |
| 2 | 3-Aminopropyltriethoxysilane | 18.26 |
| 3 | Ethyl Acetate | 36.91 |
| 4 | Ethyl Acetate | 26.12 |
| 5 | 75HDI Homopolymer | 613.09 |
| 6 | Ethyl Acetate | 185.92 |

Item 1 was charged to a 3-Liter one-piece reactor and heated to 40-43° C. A solution of Items 2 and 3 was slowly added over a 0.50 Hr period, then the charge tank was flushed with Item 4. The resin was maintained at 40-43° C. for 1 Hr and Items 5 and 6 were then added to the reactor and maintained at 40-43° C. for 1 Hr, filtered and packaged.

Final properties: ASTM solids 74.43%, 13.75% NCO, Viscosity 400 cps.

Examples 14-18

Preparation of Epoxy Terminated Polyester Resin Solutions

The epoxy terminated polyester resins were dissolved Ethyl Acetate to prepare a 60 Wt. % solution by charging the epoxy terminated polyester in a glass bottle, followed by the addition of Ethyl Acetate and mixing and heating to 50° C. until solution is homogenous in appearance. The resins are identified and properties are summarized in Table 4.

TABLE 4

Examples 14-18

| Ingredient (g) | 14 | 15 | 16 | 17 | 18 |
|---|---|---|---|---|---|
| Epoxy of Ex. 4 | 210.00 | | | | |
| Epoxy of Ex. 5 | | 210.00 | | | |
| Epoxy of Ex. 6 | | | 210.00 | | |
| Epoxy of Ex. 7 | | | | 210.00 | |
| Epoxy of Ex. 8 | | | | | 210.00 |
| Ethyl Acetate | 140.00 | 140.00 | 140.00 | 140.00 | 140.00 |
| Properties: | | | | | |
| % Solids | 60.0 | 60.0 | 60.0 | 60.0 | 60.0 |
| Viscosity (mPa * s) @ 25° C. | 60.00 | 60.00 | 60.00 | 280.00 | 100.00 |
| Density (g/cc) | 1.0816 | 1.0699 | 1.0894 | 1.0765 | 1.0774 |

Examples 19-23

Preparation of Epoxy Terminated Polyester Resin Solutions

Formulations 19 through 23 are summarized in Table 5.

TABLE 5

Examples 19-23

| Ingredient (g) | 19 | 20 | 21 | 22 | 23 |
|---|---|---|---|---|---|
| Epoxy of Ex. 9 | 200.23 | | 210.00 | | |
| Epoxy of Ex. 10 | | 202.32 | | 210.00 | 210.00 |
| Tyzor TPT | | | | | 0.01 |
| Ethyl Acetate | 133.54 | 131.69 | 140.00 | 140.00 | 139.99 |
| Properties: | | | | | |
| % Solids | 58.27 | 59.52 | 60.00 | 60.00 | 60.00 |
| Viscosity (mPa * s) @ 25° C. | 237.87 | 244.0 | 213.33 | 200.00 | 266.67 |
| Density (g/cc) | 1.0871 | 1.0901 | 1.0703 | 1.0722 | 1.0772 |

Examples 24-26

Preparation of Epoxy Terminated Polyester Resin Solutions

Formulations 24 through 26 are summarized in Table 6.

TABLE 6

Examples 24-26

| Ingredient (g) | 24 | 25 | 26 |
|---|---|---|---|
| Epoxy of Ex. 9 | 210.00 | | |
| Epoxy of Ex. 11 | | 99.95 | 99.95 |
| Tyzor TPT | 0.01 | | |
| Tin(II) 2-Ethylhexanoate | | 0.05 | |
| Butyltin tris(2-Ethylhexanoate) | | | 0.05 |
| Ethyl Acetate | 138.99 | | |
| Properties: | | | |
| % Solids | 60.00 | 60.00 | 60.00 |
| Viscosity (mPa * s) @ 25° C. | 276.67 | 253.33 | 260.00 |
| Density (g/cc) | 1.0796 | 1.0750 | 1.0759 |

Example 27

280.00 g of Adcote 1189B was diluted with 70.00 g of Ethyl Acetate to prepare a 36.0% Solids solution of the polyester resin.

Examples 28-55

Preparation of Polyester/Epoxy Terminated Polyester Resin Blend Solutions

The polyester/epoxy terminated polyester resin blend solutions were prepared by charging the high molecular polyester (Adcote 1189B, Adcote 102A, or Adcote 102E) into a bottle and then adding the epoxy terminated polyester resin solution, followed by the addition of Ethyl Acetate and 85% Phosphoric Acid. The solution mixture was then mixed and heated to 50° C. until solution is homogenous in appearance. The resins are identified and properties are summarized in Tables 7 through 12.

TABLE 7

Examples 28-32

| Ingredient (g) | 28 | 29 | 30 | 31 | 32 |
|---|---|---|---|---|---|
| Adcote 102A | 300.09 | 276.14 | 252.21 | 312.06 | 299.98 |
| Epoxy Resin Ex. 14 | 23.94 | 47.89 | 71.82 | 11.98 | |
| Epoxy Resin Ex. 15 | | | | | 23.940 |
| Ethyl Acetate | 25.92 | 25.92 | 25.92 | 25.92 | 25.92 |
| 85% Phosphoric Acid | 0.050 | 0.048 | 0.053 | 0.050 | 0.048 |
| Properties: | | | | | |
| % Solids | 34.98 | 36.63 | 38.27 | 34.16 | 34.98 |
| Viscosity (mPa * s) @ 25° C. | 380.00 | 353.30 | 300.00 | 372.50 | 480.00 |
| Density (g/cc) | 0.9379 | 0.9464 | 0.9602 | 0.9310 | 0.9347 |

TABLE 8

Examples 33-37

| Ingredient (g) | 33 | 34 | 35 | 36 | 37 |
|---|---|---|---|---|---|
| Adcote 102A | 275.50 | 252.22 | 299.98 | 276.16 | 252.20 |
| Epoxy Resin Ex. 15 | 48.74 | 72.26 | | | |
| Epoxy Resin Ex. 16 | | | 23.94 | 47.88 | 71.82 |
| Ethyl Acetate | 25.92 | 25.92 | 25.92 | 25.92 | 25.92 |
| 85% Phosphoric Acid | 0.049 | 0.048 | 0.045 | 0.049 | 0.053 |
| Properties: | | | | | |
| % Solids | 36.62 | 38.27 | 34.98 | 36.62 | 38.27 |
| Viscosity (mPa * s) @ 25° C. | 360.00 | 320.00 | 200.00 | 200.00 | 200.00 |
| Density (g/cc) | 0.9488 | 0.9647 | 0.9472 | 0.9484 | 0.9521 |

TABLE 9

Examples 38-42

| Ingredient (g) | 38 | 39 | 40 | 41 | 42 |
|---|---|---|---|---|---|
| Polyester Ex. 16 (Adcote 1189B at 60% solids) | 300.08 | 275.52 | 252.22 | 312.06 | |
| Adcote 102E | | | | | 312.06 |
| Epoxy Resin Ex. 17 | 23.96 | 48.62 | 71.98 | 11.98 | |
| Epoxy Resin Ex. 18 | | | | | 11.97 |
| Ethyl Acetate | 25.96 | 26.02 | 25.98 | 25.92 | 25.92 |
| 85% Phosphoric Acid | 0.048 | 0.052 | 0.047 | 0.049 | 0.052 |
| Properties: | | | | | |
| % Solids | 34.98 | 36.66 | 38.27 | 34.16 | 34.16 |
| Viscosity (mPa * s) @ 25° C. | 650.00 | 640.00 | 610.00 | 380.00 | 460.00 |
| Density (g/cc) | 0.9527 | 0.9550 | 0.9673 | 0.9523 | 0.9972 |

TABLE 10

Examples 43-47

| Ingredient (g) | 43 | 44 | 45 | 46 | 47 |
|---|---|---|---|---|---|
| Adcote 102E | 300.08 | 275.49 | | 315.28 | 312.06 |
| Adcote 102A | 300.08 | 275.49 | 244.92 | | |
| Epoxy Resin Ex. 18 | 23.98 | 48.51 | | | |
| Epoxy Resin Ex. 23 | | | | 8.75 | 11.97 |
| Ethyl Acetate | 25.92 | 25.92 | | 25.92 | 25.92 |
| 85% Phosphoric Acid | 0.052 | 0.052 | 0.3025 | 0.052 | 0.052 |
| Properties: | | | | | |
| % Solids | 34.99 | 36.16 | 36.08 | 33.93 | 34.16 |
| Viscosity (mPa * s) @ 25° C. | 460.00 | 520.00 | 594.17 | — | 920.00 |
| Density (g/cc) | 0.9993 | 1.0061 | 0.9337 | — | 0.9959 |

TABLE 11

Examples 48-52

| Ingredient (g) | 48 | 49 | 50 | 51 | 52 |
|---|---|---|---|---|---|
| Adcote 102E | 300.08 | 312.06 | 300.08 | 312.06 | 300.08 |
| Epoxy Resin Ex. 23 | 23.98 | | | | |
| Epoxy Resin Ex. 24 | | 11.97 | 23.98 | | |
| Epoxy Resin Ex. 25 | | | | 11.97 | 23.98 |
| Ethyl Acetate | 25.92 | 25.92 | 25.92 | 25.92 | 25.92 |
| 85% Phosphoric Acid | 0.052 | 0.052 | 0.052 | 0.052 | 0.052 |
| Properties: | | | | | |
| % Solids | 34.99 | 34.16 | 34.99 | 34.32 | 35.32 |
| Viscosity (mPa * s) @ 25° C. | 880.00 | 926.67 | 893.33 | 1000.00 | 960.00 |
| Density (g/cc) | 0.9964 | 0.9947 | 0.9976 | 0.9953 | 0.9965 |

TABLE 12

Examples 53-55

| Ingredient (g) | 53 | 54 | 55 |
|---|---|---|---|
| Adcote 102E | 312.06 | 300.08 | 312.06 |
| Epoxy Resin Ex. 25 | 11.97 | 23.98 | |
| Epoxy Resin Ex. 26 | | | 11.97 |
| Ethyl Acetate | 25.92 | 25.92 | 25.92 |
| 85% Phosphoric Acid | 0.052 | 0.052 | 0.052 |
| Properties: | | | |
| % Solids | 34.16 | 34.99 | 34.32 |
| Viscosity (mPa * s) @ 25° C. | 1140.00 | 1120.00 | 1020.00 |
| Density (g/cc) | 0.9944 | 0.9958 | 0.9974 |

Aliphatic Isocyanate Curing Agents:

The polyester and polyester/epoxy terminated polyesters were cured with: 1) Curative 1 which is composed of a 75% Vestanat T1890/100 in Ethyl Acetate, 2) Curative 2 which is composed of 75HDI Homopolymer, 3) Curative 3 which is Coreactant of Example 12, and 4) Curative 4 which is Coreactant of Example 13.

Example 56 Through 129

Preparation of Neat Adhesive Castings and DMA Characterization

The various polyester/epoxy terminated polyester resin blend systems were cured with a number of different aliphatic isocyanate curatives at various mix ratios. The adhesive castings were prepared by taking 13.0 grams of the polyester/epoxy terminated polyester blend solution and mixing it with the aliphatic isocyanate at various mix ratios in a bottle. The adhesive solution was mixed for approximately 15 to 30 minutes and then poured into a polymethylpentene petri dish. The solvent was allowed to evaporate overnight in a fume hood on a level surface, and then the castings were placed in a convection oven and cured for 7 days at 45° C. The castings were analyzed via DMA (TA Instruments Q800) using the Multi-Frequency-Strain Mode. A single applied frequency of 1 Hz from −100° C. to 150° C., with a heating rate of 3° C./min with an applied strain of 0.01% and a Preload force of 0.01 N was used. Tables 13 through 19 summarize the samples analyzed and critical properties.

TABLE 13

Properties of Examples 56-68

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 56 | Adcote 506-40:Curative 1 (100:4) | 15.9 | 1765.56 | 16.41 | 2.59 |
| 57 | Adcote 506-40:Curative 2 (100:1.5) | 12.6 | 1510.19 | 16.14 | 3.03 |
| 58 | Adcote 506-40:Curative 2 (100:2) | 10.6 | 2265.81 | 27.16 | 5.06 |
| 59 | Adcote 506-40:Curative 2 (100:4) | 3.6 | 648.35 | 39.44 | 9.48 |
| 60 | Adcote 506-40:Curative 3 (100:4) | 12.9 | 1995.89 | 15.46 | 2.89 |
| 61 | Adcote 506-40:Curative 4 (100:4) | 14.7 | 2835.86 | 23.20 | 4.13 |
| 62 | Polyester Resin of Ex 28:Curative 2 (100:2) | 3.3 | 250.46 | 6.45 | 3.73 |
| 63 | Polyester Resin of Ex 28:Curative 2 (100:4) | 4.3 | 453.87 | 9.36 | 5.91 |
| 64 | Polyester Resin of Ex 29:Curative 2 (100:2) | 0.20 | 57.29 | 4.73 | 2.55 |
| 65 | Polyester Resin of Ex 29:Curative 2 (100:4) | 3.4 | 244.44 | 7.24 | 4.62 |
| 66 | Polyester Resin of Ex 30:Curative 2 (100:2) | −4.0 | 22.30 | 5.17 | 2.19 |
| 67 | Polyester Resin of Ex 30:Curative 2 (100:4) | 1.8 | 102.11 | 6.29 | 4.37 |
| 68 | Polyester Resin of Ex 31:Curative 2 (100:2) | 2.4 | 230.84 | 6.42 | 3.89 |

TABLE 14

Properties of Examples 69-80

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 69 | Polyester Resin of Ex 31:Curative 2 (100:4) | 4.4 | 580.59 | 9.19 | 5.40 |
| 70 | Polyester Resin of Ex 35:Curative 2 (100:2) | 3.0 | 254.37 | 6.59 | 4.21 |
| 71 | Polyester Resin of Ex 35:Curative 2 (100:4) | 2.2 | 215.65 | 8.70 | 5.45 |
| 72 | Polyester Resin of Ex 36:Curative 2 (100:2) | 0.3 | 71.90 | 4.94 | 3.11 |
| 73 | Polyester Resin of Ex 36:Curative 2 (100:4) | 2.7 | 284.45 | 9.96 | 7.04 |
| 74 | Polyester Resin of Ex 37:Curative 2 (100:2) | 1.3 | 114.83 | 6.78 | 3.93 |
| 75 | Polyester Resin of Ex 37:Curative 2 (100:4) | 2.4 | 247.84 | 8.78 | 6.84 |
| 76 | Polyester Resin of Ex 38:Curative 2 (100:2) | 0.7 | 105.11 | 7.38 | 4.40 |
| 77 | Polyester Resin of Ex 38:Curative 2 (100:4) | 1.0 | 135.62 | 8.34 | 5.28 |
| 78 | Polyester Resin of Ex 39:Curative 2 (100:2) | 0.3 | 76.00 | 5.37 | 3.22 |
| 79 | Polyester Resin of Ex 39:Curative 2 (100:4) | 3.6 | 403.09 | 8.96 | 5.72 |
| 80 | Polyester Resin of Ex 40:Curative 2 (100:2) | −2.3 | 28.04 | 4.03 | 2.31 |

TABLE 15

Properties of Examples 81-92

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 81 | Polyester Resin of Ex 40:Curative 2 (100:4) | 1.3 | 174.39 | 8.99 | 6.20 |
| 82 | Polyester Resin of Ex 41:Curative 2 (100:2) | 3.6 | 573.21 | 9.66 | 5.82 |
| 83 | Polyester Resin of Ex 41:Curative 2 (100:4) | 3.1 | 449.97 | 11.23 | 6.75 |
| 84 | Polyester Resin of Ex 42:Curative 1 (100:2) | 2.8 | 249.89 | 5.05 | |
| 85 | Polyester Resin of Ex 42:Curative 1 (100:4) | 8.5 | 2531.63 | 7.94 | 2.20 |
| 86 | Polyester Resin of Ex 42:Curative 2 (100:2) | 2.2 | 217.40 | 6.26 | 3.45 |

TABLE 15-continued

Properties of Examples 81-92

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 87 | Polyester Resin of Ex 42:Curative 2 (100:4) | 4.3 | 548.48 | 6.49 | 3.65 |
| 88 | Polyester Resin of Ex 42:Curative 3 (100:2) | 1.1 | 156.97 | 6.18 | |
| 89 | Polyester Resin of Ex 42:Curative 3 (100:4) | 2.9 | 336.79 | 7.06 | 4.04 |
| 90 | Polyester Resin of Ex 42:Curative 4 (100:2) | 0.7 | 127.22 | 6.94 | |
| 91 | Polyester Resin of Ex 42:Curative 4 (100:4) | 6.1 | 1516.02 | 9.09 | 4.65 |
| 92 | Polyester Resin of Ex 43:Curative 1 (100:2) | 5.0 | 593.95 | 5.05 | |

TABLE 16

Properties of Examples 93-103

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 93 | Polyester Resin of Ex 43:Curative 1 (100:4) | 7.3 | 1735.04 | 8.91 | 2.67 |
| 94 | Polyester Resin of Ex 43:Curative 2 (100:2) | 4.1 | 554.32 | 8.70 | 5.41 |
| 95 | Polyester Resin of Ex 43:Curative 2 (100:4) | 6.7 | 2417.00 | 14.72 | 8.54 |
| 96 | Polyester Resin of Ex 49:Curative 3 (100:2) | 1.4 | 156.97 | 5.93 | |
| 97 | Polyester Resin of Ex 43:Curative 3 (100:4) | 4.7 | 692.38 | 7.53 | 2.26 |
| 98 | Polyester Resin of Ex 43:Curative 4 (100:2) | 1.5 | 210.77 | 7.32 | 0.73 |
| 99 | Polyester Resin of Ex 43:Curative 4 (100:4) | 5.8 | 1318.74 | 10.69 | 5.56 |
| 100 | Polyester Resin of Ex 45:Curative 1 (100:2) | 1.4 | 100.74 | 6.23 | 2.33 |
| 101 | Polyester Resin of Ex 45:Curative 1 (100:4) | 2.9 | 352.14 | 9.95 | 5.44 |
| 102 | Polyester Resin of Ex 45:Curative 2 (100:2) | 3.1 | 316.02 | 6.99 | 4.29 |
| 103 | Polyester Resin of Ex 45:Curative 2 (100:4) | 4.4 | 390.20 | 5.65 | 4.31 |

TABLE 17

Properties of Examples 104-114

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 104 | Polyester Resin of Ex 47:Curative 1 (100:4) | 5.49 | 953.98 | 8.32 | 3.11 |
| 105 | Polyester Resin of Ex 48:Curative 1 (100:4) | 5.18 | 573.13 | 5.83 | 2.02 |
| 106 | Polyester Resin of Ex 47:Curative 3 (100:4) | 2.16 | 117.03 | 3.55 | |
| 107 | Polyester Resin of Ex 48:Curative 3 (100:4) | −0.26 | 69.94 | 5.23 | |
| 108 | Polyester Resin of Ex 47:Curative 4 (100:4) | 1.25 | 99.13 | 4.52 | 2.08 |
| 109 | Polyester Resin of Ex 48:Curative 4 (100:4) | 2.46 | 299.32 | 7.45 | 3.32 |
| 110 | Polyester Resin of Ex 49:Curative 1 (100:4) | 8.05 | 655.58 | 4.69 | |
| 111 | Polyester Resin of Ex 50:Curative 1 (100:4) | 5.64 | 568.75 | 5.18 | |
| 112 | Polyester Resin of Ex 49:Curative 3 (100:4) | −4.04 | 21.49 | 3.57 | 2.16 |
| 113 | Polyester Resin of Ex 50:Curative 3 (100:4) | 7.35 | 1148.64 | 6.60 | 2.76 |
| 114 | Polyester Resin of Ex 49:Curative 4 (100:4) | 7.15 | 776.50 | 4.62 | 2.25 |

TABLE 18

Properties of Examples 115-125

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 115 | Polyester Resin of Ex 50:Curative 4 (100:4) | 10.02 | 1917.17 | 7.28 | 3.59 |
| 116 | Polyester Resin of Ex 51:Curative 1 (100:4) | 6.24 | 1146.99 | 9.01 | 3.94 |
| 117 | Polyester Resin of Ex 52:Curative 1 (100:4) | 5.99 | 836.30 | 3.20 | 3.20 |
| 118 | Polyester Resin of Ex 51:Curative 4 (100:4) | 5.79 | 872.97 | 6.98 | 3.54 |
| 119 | Polyester Resin of Ex 52:Curative 4 (100:4) | 4.73 | 408.64 | 4.82 | 2.67 |
| 120 | Polyester Resin of Ex 51:Curative 3 (100:4) | 8.06 | 1719.01 | 10.08 | 4.72 |
| 121 | Polyester Resin of Ex 52:Curative 3 (100:4) | 2.61 | 269.51 | 7.07 | 3.16 |

TABLE 18-continued

Properties of Examples 115-125

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 122 | Polyester Resin of Ex 55:Curative 2 (100:2) | 0.42 | 59.76 | 2.93 | 1.84 |
| 123 | Polyester Resin of Ex 55:Curative 4 (100:2) | 0.60 | 72.73 | 4.40 | 2.18 |
| 124 | Polyester Resin of Ex 55:Curative 1 (100:2) | −0.41 | 57.11 | 4.60 | — |
| 125 | Polyester Resin of Ex 55:Curative 3 (100:2) | 1.08 | 97.28 | 4.61 | 1.85 |

TABLE 19

Properties of Examples 126-129

| Example No. | Adhesive Formula | Tg (° C.) | Storage Modulus @ 0° C. (MPa) | Storage Modulus @ 25° C. (MPa) | Storage Modulus @ 50° C. (MPa) |
|---|---|---|---|---|---|
| 126 | Polyester Resin of Ex 53:Curative 2 (100:4) | 2.41 | 94.30 | 2.76 | 1.93 |
| 127 | Polyester Resin of Ex 54:Curative 2 (100:4) | 3.67 | 498.05 | 8.87 | 5.03 |
| 128 | Polyester Resin of Ex 53:Curative 4 (100:4) | 9.11 | 418.24 | 3.03 | 1.30 |
| 129 | Polyester Resin of Ex 54:Curative 4 (100:4) | 8.66 | 1187.32 | 6.43 | 3.01 |

Examples 130 Through 297

Adhesive Lamination Screening Studies

The various polyester/epoxy terminated polyester resin blend systems were cured with a number of different aliphatic isocyanate curatives at various mix ratios. The adhesive coating solutions were prepared by taking 30.0 grams of the polyester/epoxy terminated polyester blend solution and mixing it with the aliphatic isocyanate at various mix ratios in a bottle.

The compositions of the adhesive formulas are summarized in Tables 20 through 22. The adhesive solution was mixed for approximately 15 to 30 minutes and then coated onto 50 micron Aluminum Foil with a Mayer rod to yield a coating weight of 5.70 g/m², and then laminated to 25 micron Cast Polypropylene film using a nip temperature of 82° C. (180° F.). The laminates are cured by either Cure Cycle A or Cure Cycle B.

Cure Cycle A: laminates were cured 1 day at ambient temperature and then were cured in a convection oven at 45° C. for 14 days. Cure Cycle B: laminates were cured in a convection oven at 45° C. for 7 days.

Adhesion bond strengths were determined on a 15 mm wide strip of laminate on a Thwing-Albert Tensile Tester (Model QC-3A) with a 50 Newton load cell at a 10.0 cm/min rate. The following abbreviations are used to describe test results: as: adhesive split; ftr: film tear; fst: film stretch; at: adhesive transfer; af: adhesive failure; pfs: partial film stretch; us: unable to separate laminate. The drawability of the laminates was determined by examining the % extension of the laminate in the machine and transverse direction on laminate strip 15 mm×175 mm utilizing an Instron Tensile Tester. Test Conditions: The test conditions for the Instron are: fixture gap 12.7 cm, Load Cell 0-50 Newton's, rate of extension (head speed) 5.08 cm/min, 100% extension; the % Strain at Break (%) and Stress at Break (psi) in the machine and transverse direction for 5 samples is measured and averaged.

Tables 23 through 25 summarize the properties for the various adhesive formulas and laminates.

TABLE 20

Adhesive Formula Compositions

| Adhesive Example | Polyester Blend | Curative | Mix Ratio |
|---|---|---|---|
| 130 | Adcote 506-40 | Curative 1 | 100:4 |
| 131 | Adcote 506-40 | Curative 2 | 100:1.5 |
| 132 | Polyester Blend Ex. 45 | Curative 2 | 100:1.5 |
| 133 | Adcote 506-40 | Curative 1 | 100:4 |
| 134 | Polyester Blend Ex. 28 | Curative 2 | 100:4 |
| 135 | Polyester Blend Ex. 29 | Curative 2 | 100:4 |
| 136 | Polyester Blend Ex. 30 | Curative 2 | 100:4 |
| 137 | Polyester Blend Ex. 31 | Curative 2 | 100:4 |
| 138 | Polyester Blend Ex. 35 | Curative 2 | 100:2 |
| 139 | Polyester Blend Ex. 35 | Curative 2 | 100:4 |
| 140 | Polyester Blend Ex. 36 | Curative 2 | 100:4 |
| 141 | Polyester Blend Ex. 37 | Curative 2 | 100:4 |
| 142 | Polyester Blend Ex. 38 | Curative 2 | 100:4 |
| 143 | Polyester Blend Ex. 39 | Curative 2 | 100:4 |
| 144 | Polyester Blend Ex. 40 | Curative 2 | 100:4 |
| 145 | Polyester Blend Ex. 41 | Curative 2 | 100:2 |
| 146 | Polyester Blend Ex. 41 | Curative 2 | 100:4 |
| 147 | Polyester Blend Ex. 41 | Curative 1 | 100:4 |
| 148 | Polyester Blend Ex. 38 | Curative 1 | 100:4 |
| 149 | Polyester Blend Ex. 41 | Curative 4 | 100:4 |
| 150 | Polyester Blend Ex. 38 | Curative 4 | 100:4 |
| 151 | Polyester Blend Ex. 41 | Curative 3 | 100:4 |
| 152 | Polyester Blend Ex. 38 | Curative 3 | 100:4 |
| 153 | Polyester Blend Ex. 41 | Curative 1 | 100:4 |
| 154 | Polyester Blend Ex. 38 | Curative 1 | 100:4 |
| 155 | Polyester Blend Ex. 41 | Curative 1 | 100:2 |
| 156 | Polyester Blend Ex. 38 | Curative 1 | 100:2 |
| 157 | Polyester Blend Ex. 41 | Curative 3 | 100:2 |
| 158 | Polyester Blend Ex. 38 | Curative 3 | 100:2 |
| 159 | Polyester Blend Ex. 42 | Curative 2 | 100:4 |
| 160 | Polyester Blend Ex. 43 | Curative 2 | 100:4 |
| 161 | Polyester Blend Ex. 44 | Curative 2 | 100:4 |
| 162 | Polyester Blend Ex. 42 | Curative 1 | 100:4 |
| 163 | Polyester Blend Ex. 43 | Curative 1 | 100:4 |
| 164 | Polyester Blend Ex. 44 | Curative 1 | 100:4 |

TABLE 21

Adhesive Formula Compositions

| Adhesive Example | Polyester Blend | Curative | Mix Ratio |
|---|---|---|---|
| 165 | Polyester Blend Ex. 42 | Curative 3 | 100:4 |
| 166 | Polyester Blend Ex. 43 | Curative 3 | 100:4 |
| 167 | Polyester Blend Ex. 42 | Curative 3 | 100:4 |
| 168 | Polyester Blend Ex. 43 | Curative 3 | 100:4 |
| 169 | Polyester Blend Ex. 42 | Curative 1 | 100:4 |
| 170 | Polyester Blend Ex. 43 | Curative 1 | 100:4 |

TABLE 21-continued

Adhesive Formula Compositions

| Adhesive Example | Adhesive System Polyester Blend | Curative | Mix Ratio |
|---|---|---|---|
| 171 | Polyester Blend Ex. 47 | Curative 1 | 100:4 |
| 172 | Polyester Blend Ex. 48 | Curative 1 | 100:4 |
| 173 | Polyester Blend Ex. 47 | Curative 4 | 100:4 |
| 174 | Polyester Blend Ex. 48 | Curative 4 | 100:4 |
| 175 | Polyester Blend Ex. 47 | Curative 3 | 100:4 |
| 176 | Polyester Blend Ex. 48 | Curative 3 | 100:4 |
| 177 | Polyester Blend Ex. 47 | Curative 1 | 100:2 |
| 178 | Polyester Blend Ex. 48 | Curative 1 | 100:2 |
| 179 | Polyester Blend Ex. 47 | Curative 4 | 100:2 |
| 180 | Polyester Blend Ex. 48 | Curative 4 | 100:2 |
| 181 | Polyester Blend Ex. 47 | Curative 3 | 100:2 |
| 182 | Polyester Blend Ex. 48 | Curative 3 | 100:2 |
| 183 | Polyester Blend Ex. 49 | Curative 1 | 100:4 |
| 184 | Polyester Blend Ex. 50 | Curative 1 | 100:4 |
| 185 | Polyester Blend Ex. 49 | Curative 4 | 100:4 |
| 186 | Polyester Blend Ex. 50 | Curative 4 | 100:4 |
| 187 | Polyester Blend Ex. 49 | Curative 3 | 100:4 |
| 188 | Polyester Blend Ex. 50 | Curative 3 | 100:4 |
| 189 | Polyester Blend Ex. 49 | Curative 1 | 100:2 |
| 190 | Polyester Blend Ex. 50 | Curative 1 | 100:2 |
| 191 | Polyester Blend Ex. 49 | Curative 4 | 100:2 |
| 192 | Polyester Blend Ex. 50 | Curative 4 | 100:2 |
| 193 | Polyester Blend Ex. 49 | Curative 3 | 100:2 |
| 194 | Polyester Blend Ex. 50 | Curative 3 | 100:2 |
| 195 | Polyester Blend Ex. 47 | Curative 2 | 100:4 |
| 196 | Polyester Blend Ex. 53 | Curative 2 | 100:4 |
| 197 | Polyester Blend Ex. 54 | Curative 2 | 100:4 |
| 198 | Polyester Blend Ex. 53 | Curative 4 | 100:4 |
| 199 | Polyester Blend Ex. 54 | Curative 4 | 100:4 |
| 200 | Polyester Blend Ex. 53 | Curative 2 | 100:2 |
| 201 | Polyester Blend Ex. 54 | Curative 2 | 100:2 |

TABLE 22

Adhesive Formula Compositions

| Adhesive Example | Adhesive System Polyester Blend | Curative | Mix Ratio |
|---|---|---|---|
| 202 | Polyester Blend Ex. 53 | Curative 4 | 100:2 |
| 203 | Polyester Blend Ex. 54 | Curative 4 | 100:2 |
| 204 | Polyester Blend Ex. 51 | Curative 1 | 100:2 |
| 205 | Polyester Blend Ex. 52 | Curative 1 | 100:2 |
| 206 | Polyester Blend Ex. 51 | Curative 3 | 100:2 |
| 207 | Polyester Blend Ex. 52 | Curative 3 | 100:2 |
| 208 | Polyester Blend Ex. 51 | Curative 4 | 100:2 |
| 209 | Polyester Blend Ex. 52 | Curative 4 | 100:2 |
| 210 | Polyester Blend Ex. 55 | Curative 2 | 100:2 |
| 211 | Polyester Blend Ex. 55 | Curative 4 | 100:2 |
| 212 | Polyester Blend Ex. 55 | Curative 1 | 100:2 |
| 213 | Polyester Blend Ex. 55 | Curative 3 | 100:2 |

TABLE 23

Properties

| Laminate Example | Adhesive Example | Cure Cycle | Bond Strength (N/15 mm) | | | | % Extension[a] | |
|---|---|---|---|---|---|---|---|---|
| | | | Initial | 1 Day | 7 Days | After Retort (121° C./1 Hr) | Trans | Mach |
| 214 | 130 | A | 3.56, as | 6.32, as | 7.08, fst | us | 11.62 | 12.54 |
| 215 | 131 | A | 4.73, as | 6.32, as | 7.48, fst | 7.15, at | 11.25 | 12.29 |
| 216 | 132 | A | 2.12, as | 4.49, at | 4.31, at | 2.40, at | 11.44 | 11.23 |
| 217 | 133 | B | 2.56, as | 6.68, fs | 6.64, fs | 8.79, fs | 11.87 | 13.05 |
| 218 | 134 | A | 0.41, as | 3.32, at | 6.04, fst | 2.71, at | 11.37 | 11.71 |
| 219 | 135 | A | 0.08, as | 1.79, at | 3.93, at | 2.82, at | 11.60 | 11.87 |
| 220 | 136 | A | 0.11, as | 1.17, at | 3.60, at | 3.06, at | 11.68 | 11.65 |
| 221 | 137 | A | 2.23, as | 2.73, at | 5.58, fst | 2.30, at | 11.02 | 11.80 |
| 222 | 138 | A | 0.83, as | 2.52, at | 5.60, fst | 3.29, at | 11.40 | 11.89 |
| 223 | 139 | A | 1.56, at | 2.68, at | 6.30, fst | 2.87, at | 11.86 | 11.89 |
| 224 | 140 | A | 0.34, as | 1.66, at | 4.08, at | 3.47, at | 12.77 | 11.88 |
| 225 | 141 | A | 0.18, as | 0.88, at | 3.10, at | 3.40, at | 11.98 | 11.65 |
| 226 | 142 | A | 1.81, as | 3.67, at | 5.93, fst | 2.83, at | 11.46 | 12.56 |
| 227 | 143 | A | 1.26, as | 2.98, at | 4.31, at | 2.44, at | 13.11 | 12.54 |
| 228 | 144 | A | 0.35, as | 0.48, as | 3.32, at | 2.51, at | 12.29 | 12.90 |
| 229 | 145 | A | 2.89, as | 6.00, fst | 6.19, fst | 2.44, at | 11.05 | 11.41 |
| 230 | 146 | A | 2.40, as | 2.76, at | 6.38, fst | 3.26, at | 11.90 | 11.89 |
| 231 | 147 | A | 2.60, as | 2.74, af | 6.01, fst | 5.98, fst | 12.01 | 12.28 |
| 232 | 148 | A | 1.72, as | 2.23, at | 6.30, fst | 5.54, at | 12.06 | 12.35 |
| 233 | 149 | B | 2.74, as | 5.73, fst | 6.73, fst | 5.97, fst | 12.07 | 11.85 |
| 234 | 150 | B | 2.23, as | 5.91, fst | 7.09, fst | 4.93, fst | 12.04 | 11.97 |
| 235 | 151 | B | 2.36, as | 5.30, fst | 5.97, fst | 5.62, fst | 11.61 | 11.49 |
| 236 | 152 | B | 3.21, as | 4.10, as | 6.08, fst | 5.72, fst | 11.55 | 11.99 |
| 237 | 153 | B | 3.04, as | 4.36, at | 5.95, fst | 4.54, at | 12.33 | 12.16 |
| 238 | 154 | B | 2.20, as | 3.43, at | 5.93, fst | 4.21, at | 11.09 | 11.51 |
| 239 | 155 | B | 2.75, as | 2.39, at | 5.75, fst | 4.10, at | 11.88 | 11.32 |
| 240 | 156 | B | 2.79, as | 3.25, at | 5.71, fst | 4.38, at | 11.33 | 12.27 |
| 241 | 157 | B | 2.20, as | 4.02, at | 5.80, fst | 5.30, at | 11.62 | 11.69 |
| 242 | 158 | B | 1.80, as | 3.56, at | 5.80, fst | 3.88, at | 11.74 | 11.60 |

TABLE 23-continued

| | | | Properties | | | | | |
|---|---|---|---|---|---|---|---|---|
| | | | Bond Strength (N/15 mm) | | | | | |
| Laminate Example | Adhesive Example | Cure Cycle | Initial | 1 Day | 7 Days | After Retort (121° C./ 1 Hr) | % Extension[a] Trans | Mach |
| 243 | 159 | B | 1.86, as | 5.16, at | 6.26, fst | 3.75, at | 12.19 | 12.31 |
| 244 | 160 | B | 1.38, as | 4.61, at | 6.10, fst | 3.27, at | 11.61 | 11.98 |
| 245 | 161 | B | 0.80, as | 3.59, at | 5.13, at | 3.39, at | 12.23 | 11.65 |
| 246 | 162 | B | 2.48, as | 4.03, at | 6.37, fst | 5.87, fst | 11.43 | 12.59 |
| 247 | 163 | B | 2.34, as | 3.92, at | 6.34, fst | 5.19, fst | 11.74 | 12.81 |
| 248 | 164 | B | 1.77, as | 2.77, at | 6.19, fst | 4.31, at | 10.83 | 12.58 |

[a]Trans: transverse direction, Mach: machine direction

TABLE 24

| | | | Properties | | | | | |
|---|---|---|---|---|---|---|---|---|
| | | | Bond Strength (N/15 mm) | | | | | |
| Laminate Example | Adhesive Example | Cure Cycle | Initial | 1 Day | 7 Days | After Retort (121° C./1 Hr) | % Extension[a] Trans | Mach |
| 249 | 165 | B | 2.11, as | 4.25, at | 6.44, fst | 5.81, fst | 11.67 | 11.70 |
| 250 | 166 | B | 2.26, as | 4.32, at | 6.95, fst | 5.72, fst | 12.12 | 12.51 |
| 251 | 167 | B | 2.96, as | 5.84, fst | 6.90, fst | 3.68, at | 11.58 | 12.28 |
| 252 | 168 | B | 2.17, as | 4.51, at | 6.36, fst | 5.25, fst | 11.29 | 12.67 |
| 253 | 169 | B | 2.21, as | 5.28, fst | 6.25, fst | 6.01, fst | 11.47 | 12.90 |
| 254 | 170 | B | 1.00, as | 3.20, at | 5.97, fst | 4.36, at | 12.10 | 12.30 |
| 255 | 171 | B | 2.26, as | 4.94, pfs | 6.16, pfs | 7.06, pfs | 12.42 | 12.43 |
| 256 | 172 | B | 1.97, as | 3.66, pfs | 6.07, pfs | 5.80, pfs | 11.40 | 12.58 |
| 257 | 173 | B | 2.33, as | 5.48, pfs | 6.50, fs | 4.76, at | 12.54 | 11.70 |
| 258 | 174 | B | 2.15, as | 4.58, at | 6.89, fs | 4.26, at | 12.56 | 13.13 |
| 259 | 175 | B | 2.17, as | 5.33, pfs | 6.10, pfs | 5.46, pfs | 11.94 | 13.37 |
| 260 | 176 | B | 2.66, as | 4.31, at | 6.21, pfs | 5.66, pfs | 13.69 | 12.79 |
| 261 | 177 | B | 1361, as | 3.22, at | 6.55, fs | 5.46, pfs | 11.98 | 11.95 |
| 262 | 178 | B | 1.27, as | 2.62, at | 6.40, fs | 4.24, at | 11.53 | 11.94 |
| 263 | 179 | B | 2.33, as | 5.70, pfs | 7.64, fs | 5.46, pfs | 12.07 | 11.62 |
| 264 | 180 | B | 1.74, as | 3.93, at | 7.65, fs | 4.44, at | 11.91 | 11.13 |
| 265 | 181 | B | 2.51, as | 3.81, at | 6.98, fs | 4.88, at | 11.10 | 11.99 |
| 266 | 182 | B | 1.93, as | 3.34, at | 6.70, fs | 4.15, at | 12.11 | 11.59 |
| 267 | 183 | B | 2.28, as | 5.63, pfs | 6.20, pfs | 5.94, pfs | 8.58 | 7.18 |
| 268 | 184 | B | 1.29, as | 3.69, at | 6.17, pfs | 5.34, pfs | 8.35 | 7.54 |
| 269 | 185 | B | 1.67, as | 5.61, pfs | 6.04, pfs | 3.69, at | 8.90 | 7.98 |
| 270 | 186 | B | 1.96, as | 4.26, at | 5.97, pfs | 4.57, pfs | 8.70 | 7.56 |
| 271 | 187 | B | 2.06, as | 5.42, pfs | 6.37, fps | 5.75, pfs | 8.33 | 7.82 |
| 272 | 188 | B | 1.99, as | 4.03, at | 5.75, pfs | 4.64, at | 8.98 | 7.21 |
| 273 | 189 | B | 1.49, as | 2.85, at | 5.82, pfs | 3.74, at | 8.30 | 7.04 |
| 274 | 190 | B | 0.58, as | 2.27, at | 6.14, fs | 3.69, at | 8.17 | 6.42 |
| 275 | 191 | B | 1.64, as | 5.09, pfs | 6.67, fs | 5.30, pfs | 7.29 | 7.04 |
| 276 | 192 | B | 0.93, as | 3.51, at | 7.08, fs | 5.22, pfs | 7.62 | 6.68 |
| 277 | 193 | B | 2.11, as | 3.97, at | 6.86, fs | 5.62, pfs | 7.61 | 6.93 |
| 278 | 194 | B | 1.27, as | 2.86, at | 6.27, fs | 4.07, at | 7.88 | 6.92 |
| 279 | 195 | B | 1.88, as | 6.27, pfs | 6.62, fs | 3.89, at | 7.83 | 7.29 |
| 280 | 196 | B | 1.45, as | 6.16, pfs | 6.68, fs | 4.58, at | 8.37 | 7.37 |
| 281 | 197 | B | 1.25, as | 5.67, pfs | 6.71, fs | 4.06, at | 8.63 | 7.74 |
| 282 | 198 | B | 2.04, as | 5.61, pfs | 6.34, fs | 5.76, pfs | 8.49 | 7.12 |
| 283 | 199 | B | 2.12, as | 5.33, pfs | 6.26, fs | 5.56, pfs | 8.70 | 7.94 |
| 284 | 200 | B | 1.13, as | 5.50, pfs | 6.56, fs | 5.17, pfs | 8.12 | 7.61 |

[a]Trans: transverse direction, Mach: machine direction

TABLE 25

| Laminate Example | Adhesive Example | Cure Cycle | Bond Strength (N/15 mm) | | | After Retort (121° C./1 Hr) | % Extension[a] | |
|---|---|---|---|---|---|---|---|---|
| | | | Initial | 1 Day | 7 Days | | Trans | Mach |
| 285 | 201 | B | 1.30, as | 5.40, pfs | 6.73, fs | 5.00, pfs | 7.80 | 7.28 |
| 286 | 202 | B | 1.47, as | 4.08, at | 6.42, fs | 5.15, pfs | 8.18 | 7.68 |
| 287 | 203 | B | 1.59, as | 3.80, at | 6.48, fs | 3.98, at | 8.11 | 7.38 |
| 288 | 204 | B | 2.25, as | 6.56, fs | 6.78, fs | 6.07, pfs | 7.66 | 7.21 |
| 289 | 205 | B | 1.61, as | 5.91, pfs | 5.69, pfs | 5.60, pfs | 7.44 | 7.02 |
| 290 | 206 | B | 1.78, as | 6.57, fs | 6.66, fs | 6.67, pfs | 7.68 | 6.84 |
| 291 | 207 | B | 1.93, as | 6.14, pfs | 6.22, pfs | 4.23, at | 7.91 | 6.98 |
| 292 | 208 | B | 2.16, as | 7.05, fs | 7.09, fs | 5.70, pfs | 7.45 | 7.30 |
| 293 | 209 | B | 1.66, as | 6.42, pfs | 6.43, fs | 5.25, pfs | 7.53 | 6.94 |
| 294 | 210 | B | 1.82, as | 6.26, fs | 6.80, fs | 3.80, at | 6.91 | 7.51 |
| 295 | 211 | B | 2.07, as | 5.99, pfs | 7.63, fs | 5.67, pfs | 8.21 | 7.31 |
| 296 | 212 | B | 2.48, as | 5.10, pfs | 7.33, fs | 6.55, pfs | 8.06 | 6.98 |
| 297 | 213 | B | 2.27, as | 5.18, fps | 6.76, pfs | 4.47, at | 8.43 | 6.05 |

[a]Trans: transverse direction, Mach: machine direction

What is claimed is:

1. A curable formulation comprising
a) a high molecular weight polyester resin having an average molecular weight (Mw) of 50,000 to 125,000;
b) an epoxy terminated polyester having the structure

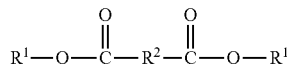

wherein —$R^2$— is a divalent organic group,
wherein $R^1$— is selected from the group consisting of

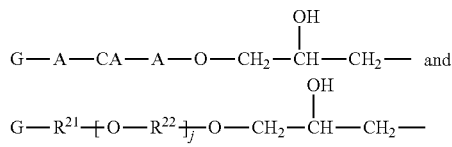

wherein -A- is a divalent alkyl group, —CA— is a divalent cycloalkyl group, j is 0 to 5, —$R^2$— is a divalent organic group, —$R^{21}$— is a divalent alkyl group, and —$R^{22}$— is a divalent alkyl group
G- is

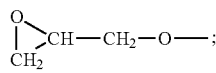

c) an additive selected from the group consisting of phosphoric acid and orthophosphoric acid;
d) a curing agent comprising of an isocyanate-based aliphatic compound or an isocyanate-based aromatic compound; and
e) a solvent
wherein, upon curing under curing conditions, the curable formulation forms at least one interpenetrating polymer network,
wherein the formulation is bisphenol-A free.

2. The curable formulation of claim 1, wherein the curable formulation is cured with the isocyanate curing agent in a mix ratio in the range of from 100:1.0 to 100:8.0.

3. The curable formulation of claim 1, wherein the high molecular weight polyester resin is prepared from at least one of the group consisting of ethylene glycol, terephthalic acid, and isophthalic acid.

4. The curable formulation of claim 1, wherein an interpenetrating polymer network is formed between epoxide groups of the epoxy terminated polyester and isocyanate groups of the isocyanate curing agent.

5. The curable formulation of claim 1, wherein the solvent is selected from the group consisting of ethyl acetate, methyl ethyl ketone, methyl acetate, and combinations thereof.

6. The curable formulation of claim 1, wherein the high molecular weight polyester resin is present in an amount in the range of from 65 to 98 weight percent, the epoxy terminated polyester is present in an amount in the range of from 2.0 to 35.0 weight percent, the additive is present in an amount in the range of from 0.01 to 0.10 weight percent.

7. The curable formulation of claim 1, having in the range of from 30 to 45 weight percent solids.

8. A laminating adhesive made from the curable formulation of claim 1.

9. The laminating adhesive of claim 8, wherein the laminating adhesive is characterized by having a glass transition temperature in the range of from −5° C. to 30° C. and a bond strength in the range of from 2.0 N/15 mm to 8.0 N/15 mm.

* * * * *